(12) United States Patent
Fix

(10) Patent No.: US 6,345,932 B1
(45) Date of Patent: Feb. 12, 2002

(54) SYSTEM FOR ALTERNATELY OPERATING STEERING AND OFFSET MECHANISMS OF COMPACTING VEHICLE

(75) Inventor: Robert L. Fix, Hagerstown, MD (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/498,249

(22) Filed: Feb. 3, 2000

Related U.S. Application Data

(60) Provisional application No. 60/118,897, filed on Feb. 5, 1999.
(51) Int. Cl.$^7$ ............................. E01C 19/26; F15B 11/00
(52) U.S. Cl. ........................ 404/126; 91/536; 180/419; 280/468
(58) Field of Search ................... 91/536, 444; 404/125, 404/126, 128; 280/468; 180/418–420

(56) References Cited

U.S. PATENT DOCUMENTS

| | | | | |
|---|---|---|---|---|
| 2,331,790 A | * | 10/1943 | Nichols, Jr. .................. | 60/471 |
| 3,302,742 A | * | 2/1967 | Sunderlin .................... | 180/420 |
| 3,966,345 A | * | 6/1976 | Kofel ........................... | 404/126 |
| 4,744,285 A | * | 5/1988 | Presley ........................ | 91/513 |
| 5,154,439 A | * | 10/1992 | Weyer ......................... | 280/468 |

* cited by examiner

Primary Examiner—David Bagnell
Assistant Examiner—Sunil Singh
(74) Attorney, Agent, or Firm—Michael Best & Friedrich LLP

(57) ABSTRACT

A control system for an industrial vehicle having an articulated frame with front and rear movably connected frame halves. The control system includes a steering mechanism disposed between the frame halves and is configured to pivot the rear frame half about the front frame half. A first hydraulic actuator is operably connected with the steering mechanism. An offset mechanism is disposed between the frame halves and is configured to displace the rear frame half with respect to the front frame half in a direction generally toward one of the lateral sides of the vehicle. A second hydraulic actuator is operably connected with the offset mechanism. A hydraulic circuit includes a hydraulic fluid source and a selector valve device connected with the fluid source and with each of the first and second actuators. The selector valve is configured to selectively direct hydraulic fluid to the first actuator to operate the steering mechanism and alternatively to the second actuator to operate the offset mechanism. An operator controller device is connected with the hydraulic circuit and is configured to adjust hydraulic flow between the fluid source and the selector valve device so as to control extent and direction of movement of the rear frame half by the selectively operated steering mechanism or offset mechanism. Furthermore, an operator input device is connected with the selector valve device and is configured to operate the selector valve to selectively direct fluid to one of the two actuators.

13 Claims, 4 Drawing Sheets

US 6,345,932 B1

SYSTEM FOR ALTERNATELY OPERATING STEERING AND OFFSET MECHANISMS OF COMPACTING VEHICLE

This application claims the benefit of U.S. Provisional Application No. 60/118,897, filed Feb. 5, 1999.

BACKGROUND OF THE INVENTION

The present invention relates to compacting vehicles, and more particularly to systems for controlling the steering and offset mechanisms of compacting vehicles.

Compacting vehicles or "compactors" used to compress a surface S, typically of soil or asphalt, are well known and generally include a frame and one or two compacting/driving drum members or "drums". The frame of such vehicles is often formed of front and rear frame halves pivotally connected by an articulated joint. These compacting vehicles are generally steered using a hydraulic cylinder which actuates a steering linkage mechanism to pivot the rear frame half about the articulated joint, and thereby turn with respect to the front frame half. Further, such vehicles often have another hydraulic cylinder which operates an offset mechanism to displace the rear frame half laterally to one side or the other with respect to the front frame half.

Generally, the steering cylinder and the offset cylinder are each operated by a separate controller. As such, it is possible to operate the steering and offset mechanisms simultaneously, which creates a potential safety hazard and diminishes the operator's ability to effectively control operation of the compacting vehicle.

It would therefore be desirable to have a compacting vehicle with a controller such that the steering and offset mechanisms cannot be simultaneously operated.

SUMMARY OF THE INVENTION

In a first aspect, the present invention is a control system for an industrial vehicle having and an articulated frame with left and right lateral sides and including a front frame half and a rear frame half movably connected with the front frame half. The system comprises a steering mechanism disposed between the front and rear frame halves and configured to pivot the rear frame half with respect to the front frame half. A first hydraulic actuator is operably connected with the steering mechanism. An offset mechanism is disposed between the front and rear frame halves and configured to displace the rear frame half with respect to the front frame half in a direction generally toward one of the lateral sides of the vehicle. A second hydraulic actuator is operably connected with the offset mechanism. Further, a hydraulic circuit includes a hydraulic fluid source and a selector valve device connected with the fluid source and with each of the first and second actuators. The selector valve is configured to selectively direct hydraulic fluid to the first actuator to operate the steering mechanism and alternatively to the second actuator to operate the offset mechanism.

In another aspect, the present invention is a compacting vehicle comprising an articulated frame having left and right lateral sides and including a front frame half and a rear frame half movably connected with the front frame half. At least one drum member is rotatably connected with one of the frame halves. A control system is mounted to the frame and includes a steering mechanism disposed between the front and rear frame halves and configured to pivot the rear frame half with respect to the front frame half. A first hydraulic actuator is operably connected with the steering mechanism. An offset mechanism is disposed between the front and rear frame halves and configured to displace the rear frame half with respect to the front frame half in a direction generally toward one of the lateral sides of the vehicle. A second hydraulic actuator is operably connected with the offset mechanism. Further, a hydraulic circuit includes a hydraulic fluid source and a selector valve device connected with the fluid source and with each of the first and second actuators. The selector valve is configured to selectively direct hydraulic fluid to the first actuator to operate the steering mechanism and alternatively to the second actuator to operate the offset mechanism.

BRIEF DESCRIPTION OF THE SEVERAL VIEWS OF THE DRAWINGS

The description of the invention below will be better understood when read in conjunction with the appended drawings. For the purpose of illustrating the invention, there is shown in the drawings, which are diagrammatic, embodiments that are presently preferred. It should be understood, however, that the invention is not limited to the precise arrangements and instrumentalities shown. In the drawings.

DESCRIPTION OF THE INVENTION

Figure 1:
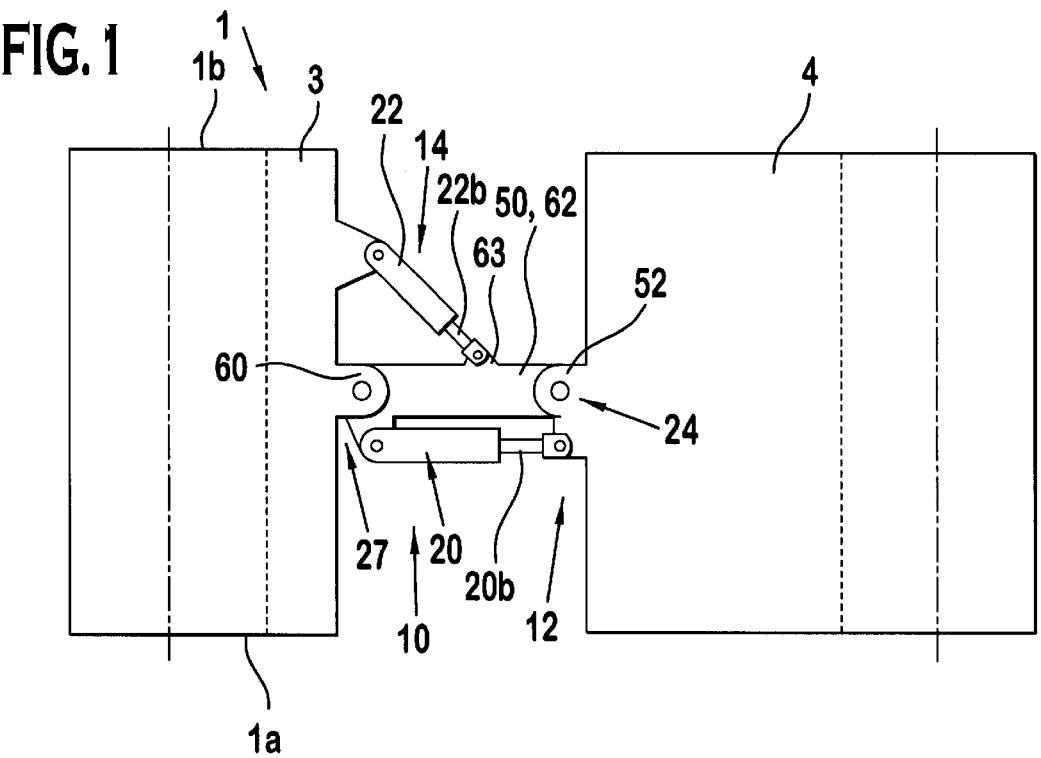
FIG. 1 is a top abstracted view of a compacting vehicle having a control system in accordance with the present invention.

Certain terminology is used in the following description for convenience only and is not limiting. The words "right" and "left" designate either directions in the drawing to which reference is made or directions generally from a longitudinal centerline of a compacting vehicle and toward a respective designated left or right side of the compacting vehicle, the particular meaning intended being apparent from the context of the description. The words "front", "frontward" and "rear", "rearward" refer to directions toward and away from, respectively, a designated front section of a compacting vehicle.

Referring now to the drawings in detail, wherein like numbers are used to indicate like elements throughout, there is shown in FIGS. 1–6 a presently preferred embodiment of a control system 10 for an industrial vehicle, preferably a compacting vehicle 1, in accordance with the present invention. The vehicle 1 has left and right lateral sides 1a, 1b and an articulated frame 2 including respectively, and including a front frame half 3 and a rear frame 4 half movably connected with the front frame half 3.

The control system 10 comprises a steering mechanism 12 disposed between the front and rear frame halves 3, 4 respectively, and configured to pivot the rear frame half 4 with respect to the front frame half 3. A first or "steering" hydraulic actuator 20 is operably connected with the steering mechanism 12. An offset mechanism 14 is disposed between the front and rear frame halves 3, 4, respectively, and configured to displace the rear frame half 4 with respect to the front frame half 3 in a direction generally toward one of the lateral sides 1a or 1b of the vehicle 1. A second or "offset" hydraulic actuator 22 is operably connected with the offset mechanism 14. Further, a hydraulic circuit 11 includes a hydraulic fluid source 15 and a selector valve device 18 connected with the fluid source 15 and with each of the first and second actuators 20, 22. The selector valve device 18 is configured to selectively direct hydraulic fluid to the first, steering actuator 20 to operate the steering mechanism 12 and alternatively to the second, offset actuator 22 to operate the offset mechanism 14.

Preferably, the control system 10 further comprises an operator controller device 13 connected with the hydraulic circuit 11. The controller device 13 is configured to adjust hydraulic flow between the fluid source 15 and the selector valve device 18 so as to control extent and direction of movement of the rear frame half 4 with respect to the front frame half 3 by a selectively operated one of the steering mechanism 12 and the offset mechanism 14. In other words, the operator controller device 13 enables a vehicle operator to move the rear frame half 4 in a desired direction and by a desired amount of movement using whichever of the mechanisms 12 or 14 is selectively receiving hydraulic fluid from the selector valve device 18 at the time the controller 13 is utilized. Additionally, the control system 10 preferably further comprises an operator input device 17 connected with the selector valve device 18 and configured to operate the selector valve 18 to selectively direct fluid to one of the first and second actuators 20, 22, respectively.

Furthermore, the selector valve device 18 is configured to "normally" direct hydraulic fluid to the steering cylinder 20 when the selector valve 18 is in an "inactive" state. When the selector valve device 18 is activated, such as by utilizing the operator input device 17 including a control button 17a (and an appropriate control circuit 17b) as discussed below, the selector valve device 18 diverts hydraulic flow from the first, steering cylinder 20 and directs hydraulic fluid to the second, offset cylinder 22. With the control system 10 of the present invention, the steering cylinder 20 (and thus the steering mechanism 12) and the offset cylinder 22 (and offset mechanism 14) are only operable alternatively of each other and cannot be operated simultaneously. Each of the above-described components of the control system 10 are described in further detail below.

Figure 2:
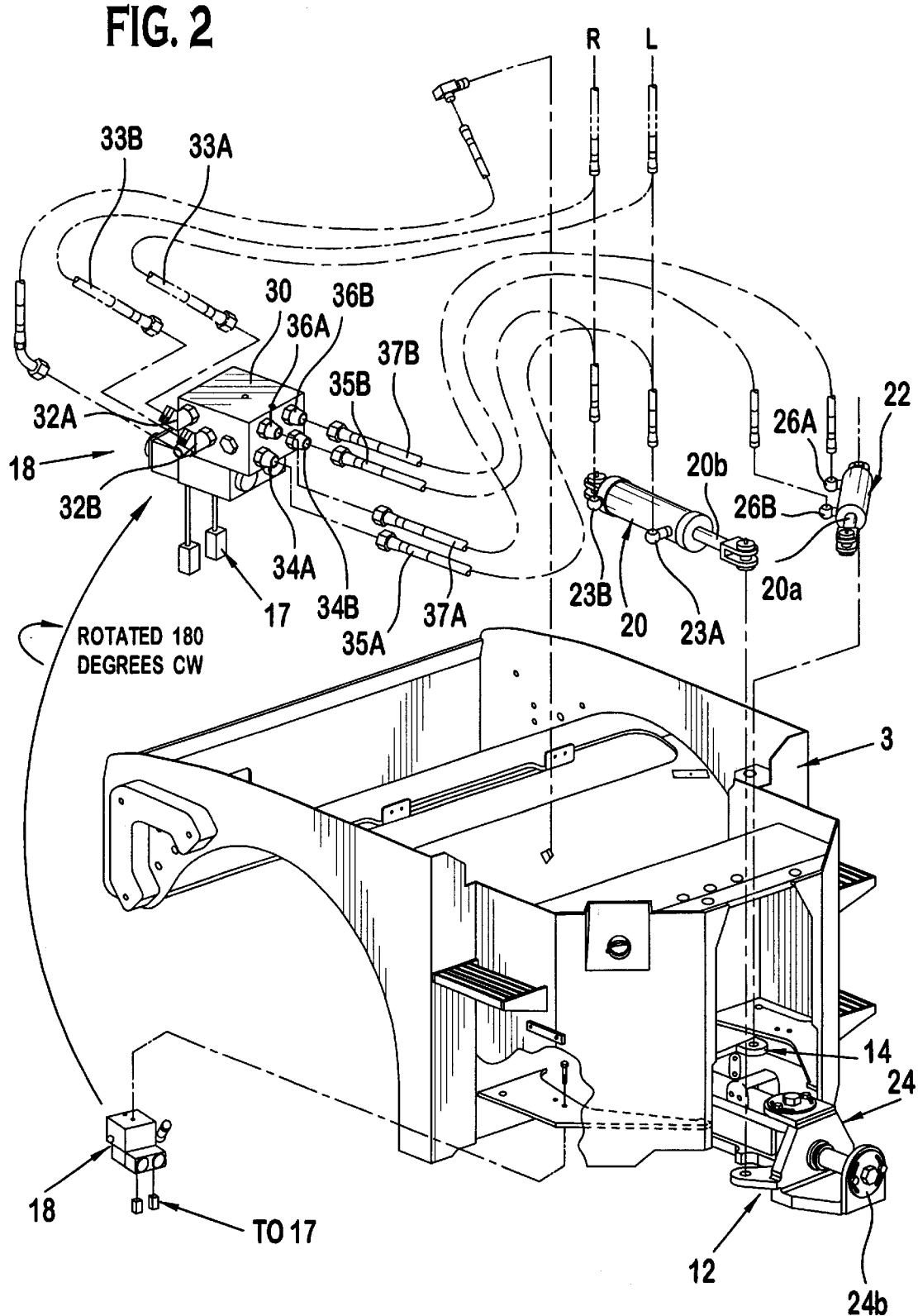
FIG. 2 is an enlarged, partially-exploded perspective view of the front frame half and the control system.

Referring to FIGS. 1 and 2, as discussed above, the control system 10 of the present invention is preferably mounted to a conventional compacting vehicle 1 or "compactor" 1. The compacting vehicle 1 has at least one compacting drum (not shown), preferably mounted to the front frame half 3, and either a second drum (not shown) mounted on the rear frame half 4 (i.e., such as with an asphalt compactor) or one or more wheels connected with the rear frame half 4 (i.e., as with a soil compactor). Further, the compacting vehicle 1 has a longitudinal centerline 1c extending between front and rear ends 1b, 1c of the vehicle 1 and left and right sides 1d, 1e, respectively. Preferably, the compacting vehicle 1 also includes an operator control console (not shown) to which a steering wheel 48 of the operator controller device 13 and a selector control button 17a of the operator input device 17 are mounted so as to be located proximal to each other, each component 48, 17 being described below.

Although the present control system 10 is preferably used with a compacting vehicle 1 as discussed above, it is within the scope of the present invention to use the control system 10 on/for any other type of industrial vehicle having an articulated frame, such as for example a loader vehicle or a utility tractor (neither shown). Furthermore, the control system 10 may alternatively be used with a vehicle having three or more frame sections (not shown), with individual components of the system 10 being provided in the appropriate quantities as required (e.g., system with three frame sections will have two steering mechanisms 12, two steering cylinders 20, two offset mechanisms 14 and two offset cylinders 22, with one of each disposed between 20 connected sections of the vehicle (not shown)).

Figure 6:
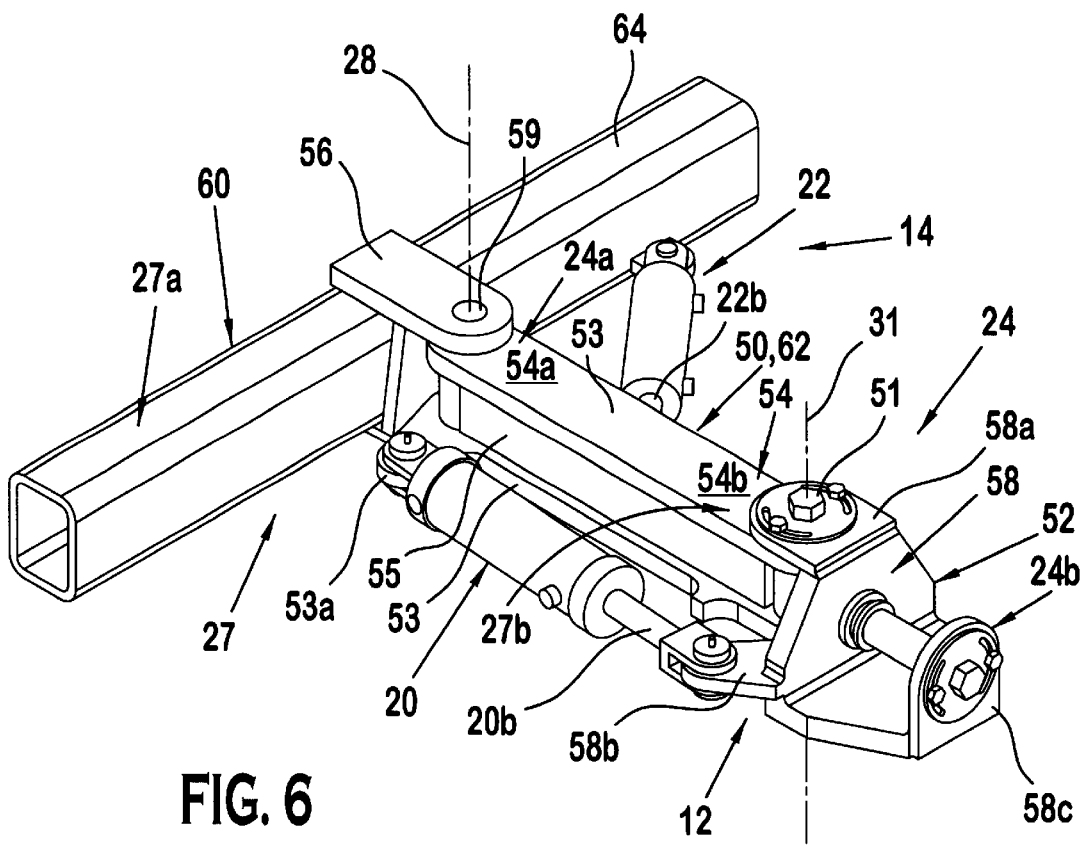
FIG. 6 is perspective view of the preferred steering and offset mechanisms controlled by the control system of the present invention.

Referring now to FIGS. 1, 2 and 6, the steering mechanism 12 is preferably a linkage 24 having a first end 24a connected with the front frame half 3 and a second end 24b connected with the rear frame half 4. The steering linkage 24 is configured to pivot the rear frame half 4 of the compacting vehicle 1 about a steering axis 31, as is well known. More specifically, the linkage 24 includes a first link 50 connected with the front frame half 3 and a second link 52 connected with the rear frame half 4 and rotatably attached to the first link 50 so as to be pivotable about the steering axis 31.

Referring particularly to FIG. 6, the first link 50 is preferably an elongated composite bar 54 consisting of two plates 53 sandwiched about a central bar 55. The front end 54a of the bar 54 being connected to a clevis-like bracket 56 attached to the front frame half 3, as discussed below. The second link 52 is a complexly-shaped weldment 58 including a U-shaped yoke section 58a into which is received a rear end 54b of the bar 54, the connected portions of links 50, 52 being joined by a pin 51. The weldment 52 also includes a rod attachment portion 52b to which a portion of the steering actuator 20 is connected, as discussed below, and a rear attachment surface 58c attached to the rear frame half 3. Although the described configuration of the steering mechanism 12 consisting of the linkage 24 is preferred, the steering mechanism 12 may be configured in any other appropriate manner that enables the rear frame half 4 to be pivotable relative to the front half 3.

Preferably, the first or steering actuator 20 is a hydraulic cylinder having a piston rod 20b movable in two opposing directions and connected with the steering linkage 24. Specifically, the end of the piston rod 20b is pinned to the attachment portion 58b of the second link 52 and the opposing end of the cylinder body is pinned to the first link 50, such that the first or steering actuator 20 moves with the first link 50 as discussed below. Most preferably, the steering actuator 20 is a double-acting hydraulic cylinder having a piston 20a, a single rod 20b, first and second fluid chambers 21A, 21B on opposing sides of the piston 20a and first and second cylinder ports 23A, 23B, each leading into a separate fluid chamber 21A, 21B, respectively.

Alternatively, the steering cylinder 20 may be any other appropriate type of hydraulic cylinder, such as for example, a single-acting cylinder that is spring-biased in one direction or a double-rod cylinder (neither shown). Further, the first, steering actuator 20 may be any other appropriate type of hydraulic actuator, such as for example, a hydraulic motor or a piston-type semi-rotary actuator (neither shown) used with an appropriately configured steering mechanism 12.

Referring now to FIGS. 1, 2 and 6, the offset mechanism 14 is preferably a linkage 27 having a first end 27a connected with the front frame half 3 and a second end 27b connected with the rear frame half 4, specifically through connected portions of the steering linkage 24. As discussed above, the offset linkage 27 is configured to displace the rear frame half 4 with respect to the front frame half 3 in a direction generally toward one of the lateral sides 1a or 1b of the vehicle 1. More specifically, the linkage 27 includes a first link 60 connected with the front frame half 3 and a second link 62 connected with the rear frame half 4 and rotatably attached to the first link 60 so as to be pivotable about the steering axis 61.

As apparent from FIGS. 1 and 6, the steering linkage 24 and the offset linkage 27 share a link member which concurrently provides the first link 50 of the steering linkage 50 and the second link 62 of the offset linkage 27, such that the offset mechanism 14 is connected with the rear frame half 4 only through the steering mechanism 12. Further, with this configuration, lateral offsetting of the rear frame half 4 is accomplished by first pivoting the second offset link 62 about the offset axis 28, and then "steering" the rear frame half 4 about the steering axis 31, such that the two frame halves are generally facing in the same direction, but are laterally offset with respect to each other. Further, when the offset linkage 27 displaces the rear frame half 4, the steering mechanism 12 is "carried" with the second offset link 62. However, it is within the scope of the present invention to provide two completely separate steering and offset mechanisms 12, 14, respectively.

Referring again to FIG. 6, the first offset link 60 is preferably an elongated beam 64 mounted to the front frame half 4 and includes the bracket 56 attached a central portion of the beam 64. The second link 62 is the elongated composite bar 54 of the steering linkage 24, as discussed above, and has a front end 54a received within the bracket 56 and rotatably connected therewith by a pin 59. The second offset link also includes a lug 63 (FIG. 1) to which a portion of the offset actuator 22 is connected, as discussed below. Although the described configuration of the offset mechanism 14 consisting of the linkage 27 is preferred, the offset mechanism 14 may be configured in any other appropriate manner that enables the rear frame half 4 to be laterally displaceable relative to the front half 3.

Preferably, the second or offset hydraulic actuator 22 is a hydraulic cylinder having a piston rod 22b movable in two opposing directions and connected with the offset linkage 27. More specifically, the end of the piston rod 22b is pinned to the lug 63 (FIG. 1) of the second link 62 and the opposing end of the cylinder body is pinned to the first link 60. Most preferably, the offset actuator 22 is a double-acting hydraulic cylinder having a piston 22a, a single rod 22b, first and second fluid chambers 25A, 25B on opposing sides of the piston 20a and first and second cylinder ports 26A, 26B, each leading into a separate fluid chamber 25A, 25B, respectively. Alternatively, as discussed above with the steering actuator 20, the offset cylinder 22 may be another appropriate type of hydraulic cylinder or the offset actuator 22 may be any other appropriate type of hydraulic actuator, depending on the actual configuration of the offset mechanism 14.

Referring now to FIGS. 2–5, the selector valve device 18 preferably includes a manifold block 30 having first and second primary ports 32A, 32B, respectively, first and second steering control ports 34A, 34B, respectively, and first and second offset control ports 36A, 36B, respectively. The first and second ports 23A, 23B of the steering cylinder 20 are each connected to the respective first and second steering control ports 34A, 34B of the manifold 30, preferably by hydraulic lines 35A, 35B, respectively. Further, the first and second ports of the offset cylinder 22 are each connected with the respective first and second offset control ports 36A, 36B of the manifold 30, preferably by hydraulic lines 37A, 37B, respectively. Furthermore, a primary valve 16, as described below, has first and second ports 42A, 42B connected with the respective first and second primary ports 32A, 32B of the manifold 30, preferably by hydraulic lines 33A, 33B, respectively.

Figure 3:
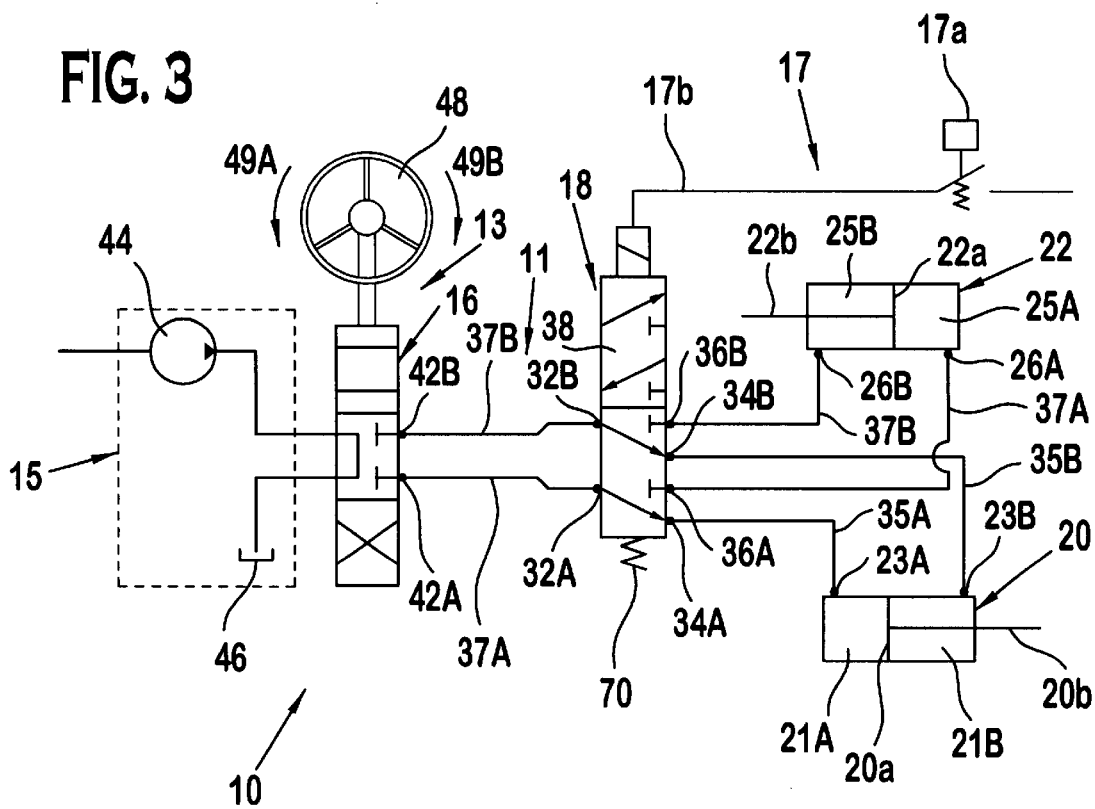
FIG. 3 is a schematic diagram of the control system, showing one preferred construction of a selector valve device.

Referring specifically to FIG. 3, in a first preferred construction, the solenoid valve device 18 has a single solenoid valve 38 that is at least partially disposed within the manifold block 30. The solenoid valve 38 is movable between a first position, as depicted in FIG. 3, and a second position (not shown). In the first valve position (FIG. 3), flow communication is established between the first primary port 32A and the first steering control port 34A and between the second primary port 32B and the second steering control port 34B. Thus, flow communication is established (through the primary valve 16) between the fluid source 15 and the steering cylinder 20 when the solenoid valve 38 is in the first valve position (FIG. 3).

In the second valve position (not shown), flow communication is established between the first primary port 32A and the first offset control port 36A and between the second primary port 32B and the second offset control port 36B. Thus, flow communication is established between the fluid source 15 and the offset cylinder 22 when the solenoid valve 38 is in the second valve position. Preferably, the solenoid valve 38 is spring-biased to the first or "initial" position by means of a spring 70 such that a fluid or flow path is normally established between each primary port 32A, 32B and the associated steering control port 34A, 34B, respectively.

Figure 4:
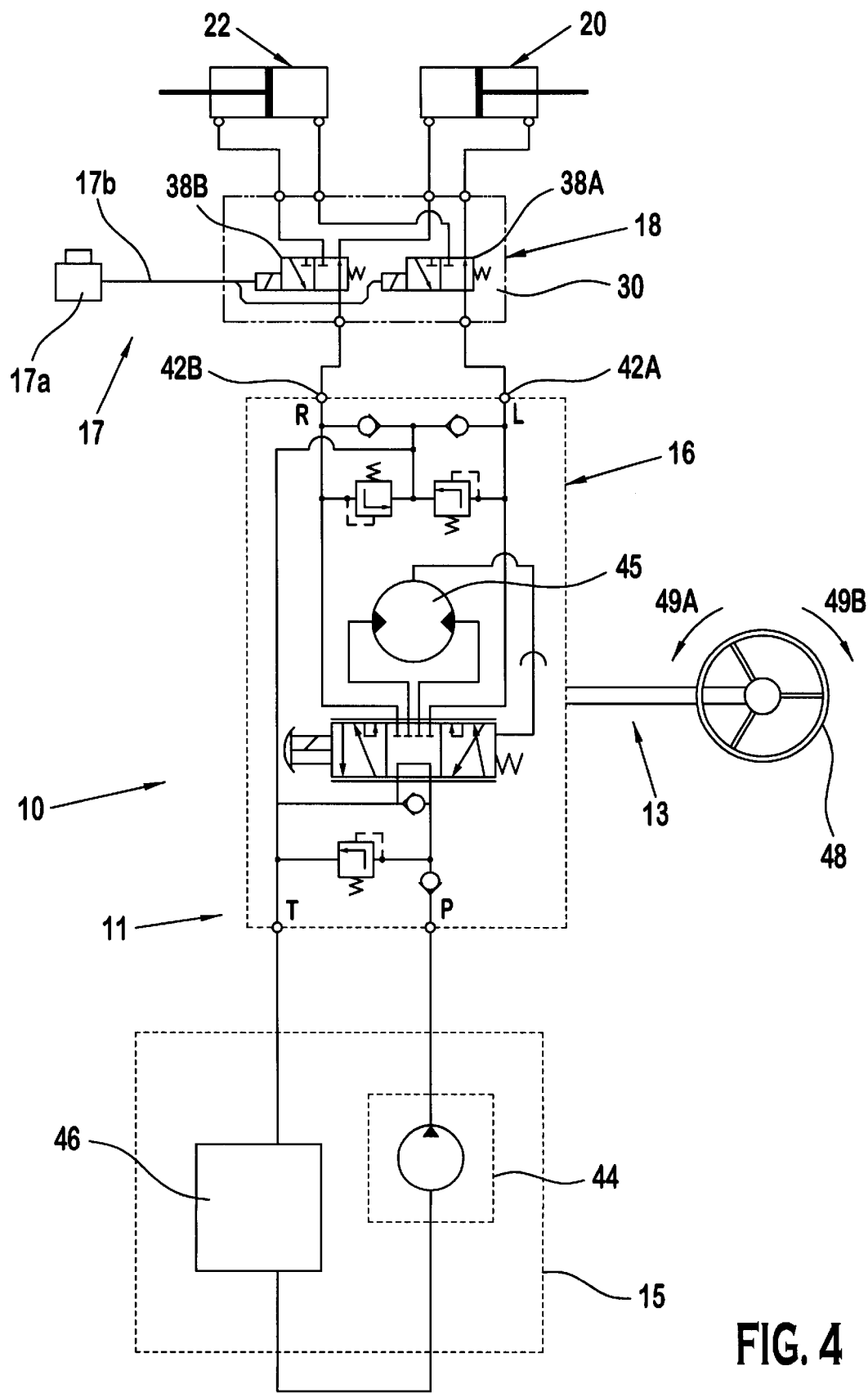
FIG. 4 is another schematic diagram of the control system, showing another preferred construction of the selector valve.
Figure 5:
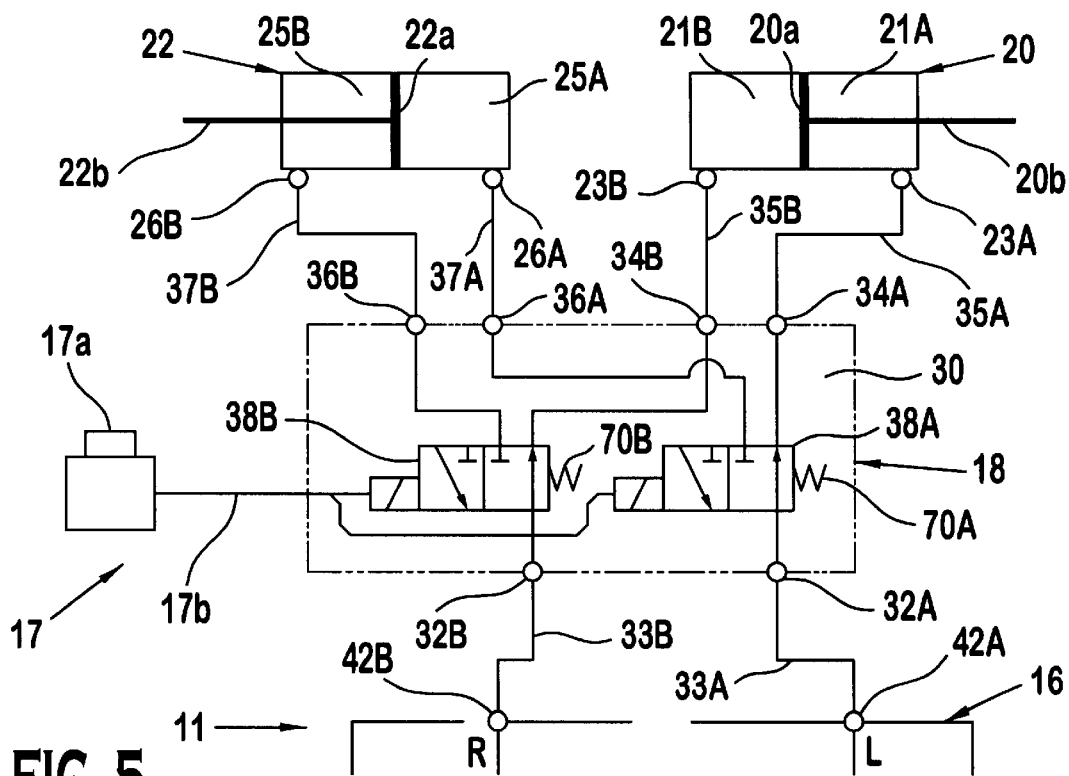
FIG. 5 is an enlarged view of a portion of the schematic diagram of FIG. 4.

Referring to FIGS. 4 and 5, in a second preferred construction, the selector valve device 18 includes first and second solenoid valves 38A, 38B, respectively, each being at least partially disposed within the manifold block 30. The first solenoid valve 38A establishes a fluid path through the manifold block 30 between the first primary port 32A and either the first steering control port 34A or alternatively the first offset control port 36A. The second solenoid valve 38B establishes a fluid path through the manifold block 30 between the second primary port 32B and either the second steering control port 34B or alternatively the second offset control port 36B. Thus, flow communication is established (through the primary valve 16) between the fluid source 15 and the steering cylinder 20 when the solenoid valve 38 is in the first valve position (FIG. 3).

More specifically, the first solenoid valve 38A is movable between a first position (FIGS. 4 and 5) where flow communication is established between the first primary port 32A and the first steering control port 34A and a second position where flow communication is established between the first primary port 34A and the first offset control port 36A. The second solenoid valve 38B is movable between a first position (FIGS. 4 and 5) where flow communication is established between the second primary port 32B and the second steering control port 34B (and thus second steering cylinder port 23B) and a second position where flow communication is established between the second primary port 32B and the second offset control port 36B (and thus second offset cylinder port 26B).

Thus, with the second construction of the selector valve device 18, flow communication is established (through the primary valve 16) between the fluid source 15 and the steering cylinder 20 when the first and second solenoid valves 38A, 38B are each in the first valve positions, as shown in FIGS. 4 and 5. Further, flow communication is established between the fluid source 15 and the offset cylinder 22 when the first and second solenoid valves 38A, 38B are each in the second valve positions (not depicted). Preferably, each solenoid valve 38A, 38B is spring-biased to the first or "initial" positions such by means of separate springs 70A, 70B such that a fluid path is normally established between each primary port 32A, 32B and the associated steering control port 34A, 34B, respectively.

Alternatively to the two preferred structures described above, the selector valve device 18 may include one or more valves of a type other than a solenoid valve, such an appropriate mechanically-operated valve or an electrically-operated rotational valve (as opposed to a linear valve) (neither shown). The control system of the present invention includes any appropriate configuration of the selector valve device 18 that enables the control system 10 to operate as described generally herein.

Referring now to FIGS. 3–5, the operator input device 17 includes an electrical circuit 17 connected with the single solenoid valve 38 in the first construction (FIG. 3) and with each of the solenoid valves 38A, 38B in the second construction (FIGS. 4 and 5). The input device 17 further includes an operator-activatable switch 17a configured to operate the solenoid valve 38 or valves 38A, 38B such that the solenoid valve 38 or valve 38A, 38B direct(s) fluid to one of the two actuators 20, 22, preferably the offset cylinder 22, when the switch 17a is activated and directs fluid to the other one of the two actuators 20, 22, preferably the steering cylinder 20, when the switch 17b is non-activated.

More specifically, when a vehicle operator desires to use the offset mechanism 14, the operator activates the selector valve device 18 by pushing the control button 17a, such that either solenoid valve 38 (FIG. 3) or the two solenoid valves 38A, 38B (FIGS. 4 and 5) move to the second or "active" valve positions as described above. When the operator no longer desires to use the offset mechanism 14, operator releases the control button 17a such that the selector valve device 18 deactivates. The single solenoid valve 38 or the two solenoid valves 38A, 38B are then spring-biased back to the first valve position(s) such that hydraulic flow is again directed to the steering cylinder 20 and prevented from flowing to the offset cylinder 22.

Alternatively, the operator input device 17 may be configured to maintain the solenoid valve 38 or valves 38A, 38B in the active positions for a predetermined interval of time before permitting spring-biasing back to their initial positions. Another alternative is to have a selector control system 17 configured to maintain the solenoid valve 398 or valves 38A, 38B in their active positions until the button 17a is again depressed by the operator, or until a second button (not shown) is depressed, at which time the solenoid valve 38 or valves 38A, 38B are electrically-driven back to their initial positions. The control system 10 of the present invention includes the above specifically-mentioned structures and all other appropriate structures for the operator input device 17 that are capable of functioning such that an operator may selectively direct fluid through the steering control ports 34A, 34B or through the offset control ports 36A, 36B.

Referring now to FIGS. 3 and 4, the fluid source 15 preferably includes a hydraulic fluid reservoir 46 connected with a fluid pump 44, the pump 44 being connected with the selector valve device 18 through a primary valve device 16 included in the hydraulic circuit 11. The primary valve device 16 forms a major portion of the operator controller device 13 (as discussed) and is connected with the fluid source 15, more particularly to the pump 44. Further, the primary valve device 16 has first and second control ports 42A, 42B connected with the respective first and second primary ports 32A, 32B of the manifold 30, preferably through hydraulic lines 33A, 33B, respectively. The primary valve device 16 is configured to direct flow between the fluid source 15 and the primary control ports 32A, 32B of the selector valve device 18, as discussed in further detail below.

Referring again to FIGS. 3–5, the operator controller device 13 includes a rotatable steering wheel 48 disposed on one of the frame halves 3 or 4, preferably front half 3. Further, the operator controller device 13 includes a rotational metering valve 45 (FIG. 4) connected with the steering wheel 48, with the fluid source 15 and with the selector valve device 18. The metering valve 45 is configured such that rotation of the steering wheel 48 in a first direction 49A causes the metering valve 45 to direct an amount of fluid to the first primary port 32A of the selector manifold 30 and rotation of the steering wheel 48 in a second direction 49B causes the metering valve 45 to direct an amount of fluid to the manifold second primary port 32A. In each case, the amounts of fluid directed to the primary ports 32A, 32B by the metering valve 45 are proportional to the extent of rotation of the wheel 48. In other words, the metering valve 45 directs a greater amount of fluid to the selector valve device 18 (and thus to the selected actuator 20 or 22) for greater angular displacement of the wheel 48 and vice-versa.

Further, the selector valve device 18 is configured to direct fluid flowing into the first primary port 32A to a selected actuator 20 or 22 so as to move the selected actuator 20 or 22 in a first direction (as discussed below) and to direct fluid flowing into the second primary port 32B to the selected actuator 20 or 22 so as to move a selected actuator 20 or 22 in a second direction (discussed below). The amount of movement of the selected actuator 20 or 22 in either first and second directions is thus proportional to the extent of rotation of the wheel 48.

More specifically, the amount of displacement of either the steering piston 20a or the offset piston 22a, and thus the amount that the rear frame half 4 is turned or offset with respect to the front frame half 3, is preferably determined by the amount of angular displacement of the steering wheel 48. The metering valve 45 functions so as to direct a quantity or volume of hydraulic fluid proportional to the amount of angular displacement of the wheel 48 through the proper control valve port 42A or 42B (i.e., depending on the direction 49A, 49B). The particular fluid quantity causes either the steering piston 20a or the offset piston 22a to move by an appropriate amount in the desired direction.

Alternatively, the primary valve device 16, and thus the operator controller device 13, may be include another appropriate type of valve (i.e., other than the rotational metering valve 45) or may be operated by means other than the steering wheel 48, for example a lever or a joystick. The present invention encompasses all appropriate types of valve devices and operator control mechanisms (e.g., steering wheel 48) that enable selective control of the cylinder 20 or 22 of the mechanisms 12, 14, respectively, so as to move by any desired amount within a range of motion and in a desired direction.

The control system 10 operates as follows. If the operator rotates the steering wheel 48 in a first ("left") direction 49A, the primary valve device 16 directs hydraulic fluid through the first control valve port 42A. The fluid then flows through the first primary port 32A of the selector valve device 18 and in one of the following alternative paths depending on the state of the selector valve device 18.

When the selector valve 18 is inactive (i.e., button 17a not pushed), the hydraulic fluid flows through the first steering control port 34A, through the single solenoid valve 38 (FIG. 3) or the first solenoid valve 38A (FIGS. 4 and 5), then through the first steering cylinder port 23A and into the first steering cylinder chamber 21A, forcing the steering piston 20a to move in a leftward direction as shown in FIGS. 3–5. Referring to FIG. 6, movement of the steering piston 20a in the indicated leftward direction causes the rod 20b to retract into the steering cylinder 20 and move generally frontwardly (toward the front frame half 3), rotating the steering linkage 24 about the steering axis 31 in direction so as to move the rear frame half 4 toward the left side 1a of the vehicle 1. Further, leftward movement of the steering piston 20a forces hydraulic fluid out of the second chamber 21B, such that the fluid flows out of the second steering cylinder port 23B, into the second steering control port 34B, through the single solenoid valve 38 or the second solenoid valve 38B, out of the selector valve device 18 through the second primary port 32B, through the second control valve port 42B and into the primary valve device 16.

Alternatively, when the operator holds down the button 17a such that the selector valve device 18 is in an activated state, the fluid entering the first primary port 32A instead flows in a path through the single solenoid valve 38 or the first solenoid valve 38A, then the first offset control port 36A, through the first offset cylinder port 26A, and into the first offset cylinder chamber 25A, forcing the offset piston 22a to move in the depicted leftward direction (FIGS. 2, 4 and 5). Again referring to FIG. 6, movement of the offset piston 22a in the indicated leftward direction causes the rod 22b to extend from the offset cylinder 22 and move generally rearwardly (toward the rear frame half 4), rotating the offset linkage 27 about the offset axis 28 in direction so as to move or offset the rear frame half 4 toward the left side 1b of the vehicle 1. Further, the leftward movement of the offset piston 22a forces hydraulic fluid out of the second offset cylinder chamber 25B, into the second offset control port 36B, through the single solenoid valve 38 or the second solenoid valve 38B, out the selector valve device 18 through the second primary port 32B, through the second control valve port 42B and into the primary valve device 16.

If the operator instead rotates the steering wheel 48 in a second ("right") direction 49B, the primary valve device 16 directs an amount of fluid through the second control valve port 42B. Hydraulic fluid then flows into the selector valve device 18 through the second primary port 32B and through the single solenoid valve 38 (FIG. 3) or the second solenoid valve 38B (FIGS. 4 and 5). Thereafter, the fluid flows out of the selector valve device 18 through either the second steering control port 34B (selector valve device 18 inactive) or through the second offset control port 36B (selector valve device 18 active), and thereby into either the second steering cylinder chamber 21B or into the second offset cylinder chamber 25B to move the respective piston 20a or 22a in the depicted rightward direction.

Further, rightward movement of the pistons 20a or 22a causes the appropriate mechanism 12 or 14, respectively, to move the rear frame half 4 toward the right with respect to the front frame half 3. Further, as with movement to the left, hydraulic fluid is forced out of either the steering cylinder 20 or the offset cylinder 22, but flows into the selector valve device 18 instead through the first steering control port 34A or the first offset control port 36A, then through the single solenoid valve 38 or first solenoid valve 38A, out of the selector valve device 18 through the first primary port 32A and into the primary valve device 16 through the first control valve port 42A.

In use, an operator of the compacting vehicle 1 rotates the steering wheel 48 to cause one of the mechanisms 12 or 14 to move the rear frame half 4 with respect to the front frame half 3. If the steering mechanism 12 is desired to be utilized, the operator merely rotates the steering wheel 48 an appropriate amount in the desired direction. Thereafter, the primary control valve device 16 and the selector valve device 18 cause hydraulic fluid to accumulate in the appropriate steering cylinder chamber 21A or 21B, depending on the direction to which the wheel 48 is rotated. The steering piston 20a is thereby caused to retract for leftward movement or extend for rightward movement, causing the steering linkage 24 to rotate the rear frame half 4 about the steering axis 31 in the left or right direction, respectively. The compacting vehicle 1 is thus steered to move in the corresponding direction.

If the operator instead desires to operate the offset mechanism 14, the operator depresses and preferably "holds down" the selector control button 17a while simultaneously rotating the steering wheel 48 in the direction toward which offsetting of the rear frame half 4 is desired. Hydraulic fluid is then directed to the appropriate chamber 25A or 25B of the offset cylinder 22 to actuate the offset mechanism 14, thereby rotating the rear frame half 4 about the offset axis 28 in the desired direction. Upon release of the selector control button 17a, further movement of the steering wheel 48 moves the piston 20a of the steering cylinder 20 (and thus steering mechanism 12) and does not move the piston 22a of the offset cylinder 22, such that the offset mechanism 14 remains at the position to which it was last moved.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A control system for an industrial vehicle having left and right lateral sides and an articulated frame including a front frame half and a rear frame half movably connected with the front frame half, the system comprising:

a steering mechanism disposed between the front and rear frame halves and configured to pivot the rear frame half with respect to the front frame half;

a first hydraulic actuator operably connected with the steering mechanism;

an offset mechanism disposed between the front and rear frame halves and configured to displace the rear frame half with respect to the front frame half in a direction generally toward one of the lateral sides of the vehicle;

a second hydraulic actuator operably connected with the offset mechanism;

a hydraulic circuit including a hydraulic fluid source and a selector valve device connected with the fluid source and with each of the first and second actuators, the selector valve being configured to selectively direct hydraulic fluid to the first actuator to operate the steering mechanism and alternatively to the second actuator to operate the offset mechanism; and an operator controller device connected with the hydraulic circuit and configured to adjust hydraulic flow between the fluid source and the selector valve device so as to control extent and direction of movement of the rear frame half with respect to the front frame half by a selectively operated one of the steering mechanism and the offset mechanism.

2. The control system as recited in claim 1 wherein the selector valve device has first and second primary ports and the operator controller device includes:

a rotatable steering wheel disposed on one of the frame halves; and a rotational metering valve connected with the steering wheel, with the fluid source and with the selector valve device and configured such that rotation of the steering wheel in a first direction causes the metering valve to direct an amount of fluid to the first primary port and rotation of the steering wheel in a second direction causes the metering valve to direct an amount of fluid to the second primary port, the amounts of fluid directed to the primary ports by the metering valve being proportional to the extent of rotation of the wheel.

3. The control system as recited in claim 2 wherein:

the first and second actuators are each movable in two opposing directions:

the selector valve device is configured to direct fluid flowing into the first primary port to a selected one of the two actuators so as to move the selected actuator in a first direction and to direct fluid flowing into the second primary port to the selected actuator so as to move a selected one of the two actuators in a second direction, the amount of movement of the selected actuator in one of the first and second directions being proportional to the extent of rotation of the wheel.

4. A control system for an industrial vehicle having left and right lateral sides and an articulated frame including a front frame half and a rear frame half movably connected with the front frame half, the system comprising:

a steering mechanism disposed between the front and rear frame halves and configured to pivot the rear frame half with respect to the front frame half;

a first hydraulic actuator operably connected with the steering mechanism;

an offset mechanism disposed between the front and rear frame halves and configured to displace the rear frame half with respect to the front frame half in a direction generally toward one of the lateral sides of the vehicle;

a second hydraulic actuator operably connected with the offset mechanism;

a hydraulic circuit including a hydraulic fluid source and a selector valve device connected with the fluid source and with each of the first and second actuators, the selector valve being configured to selectively direct hydraulic fluid to the first actuator to operate the steering mechanism and alternatively to the second actuator to operate the offset mechanism; and an operator input device connected with the selector valve device and configured to operate the selector valve to selectively direct fluid to one of the first and second actuators, wherein:

the selector valve device includes a solenoid valve; and the operator input device includes an electrical circuit connected with the solenoid valve and having an operator-activatable switch configured to operate the solenoid valve such that the solenoid valve directs fluid to one of the two actuators when the switch is activated and directs fluid to the other one of the two actuators when the switch is non-activated.

5. A control system for an industrial vehicle having left and right lateral sides and an articulated frame including a front frame half and a rear frame half movably connected with the front frame half, the system comprising:

a steering mechanism disposed between the front and rear frame halves and configured to pivot the rear frame half with respect to the front frame half;

a first hydraulic actuator operably connected with the steering mechanism;

an offset mechanism disposed between the front and rear frame halves and configured to displace the rear frame half with respect to the front frame half in a direction generally toward one of the lateral sides of the vehicle;

a second hydraulic actuator operably connected with the offset mechanism;

a hydraulic circuit including a hydraulic fluid source and a selector valve device connected with the fluid source and with each of the first and second actuators, the selector valve being configured to selectively direct hydraulic fluid to the first actuator to operate the steering mechanism and alternatively to the second actuator to operate the offset mechanism; and an operator input device connected with the selector valve device and configured to operate the selector valve to selectively direct fluid to one of the first and second actuators, wherein the selector valve device includes:

a manifold having first and second primary ports, first and second steering control ports and first and second offset ports;

a solenoid valve at least partially disposed within the manifold and movable between a first position where flow communication is established between the first primary port and the first steering port and between the second primary port and the second steering port and a second position where flow communication is established between the first primary port and the first offset port and between the second primary port and the second offset port.

6. The control system as recited in claim 5 wherein:

the hydraulic circuit further includes a primary valve connected with the fluid source and with the first and second primary ports of the manifold and configured to direct flow between the fluid source and the primary control ports;

the first actuator is connected with the first and second steering control ports of the manifold;

the second actuator is connected with the first and second offset control ports of the manifold;

flow communication is established between the fluid source and the first actuator when the solenoid valve is in the first valve position; and flow communication is established between the fluid source and the second actuator when the solenoid valve is in the second valve position.

7. A control system for an industrial vehicle having left and right lateral sides and an articulated frame including a front frame half and a rear frame half movably connected with the front frame half, the system comprising:

a steering mechanism disposed between the front and rear frame halves and configured to pivot the rear frame half with respect to the front frame half;

a first hydraulic actuator operably connected with the steering mechanism;

an offset mechanism disposed between the front and rear frame halves and configured to displace the rear frame half with respect to the front frame half in a direction generally toward one of the lateral sides of the vehicle;

a second hydraulic actuator operably connected with the offset mechanism; and a hydraulic circuit including a hydraulic fluid source and a selector valve device connected with the fluid source and with each of the first and second actuators, the selector valve being configured to selectively direct hydraulic fluid to the first actuator to operate the steering mechanism and alternatively to the second actuator to operate the offset mechanism, wherein the selector valve device includes:
- a manifold having first and second primary ports, first and second steering control ports and first and second offset ports;
- a first solenoid valve at least partially disposed within the manifold and movable between a first position where flow communication is established between the first primary port and the first steering control port and a second position where flow communication is established between the first primary port and the first offset control port; and
- a second solenoid valve at least partially disposed within the manifold and movable between a first position where flow communication is established between the second primary port and the second steering control port and a second position where flow communication is established between the primary port and the second offset control port.

8. The control system as recited in claim 7 wherein:
the hydraulic circuit further includes a primary valve connected between the fluid source and the first and second primary ports of the manifold and configured to direct flow between the fluid source and the primary control ports;
the first actuator is connected with the first and second steering control ports of the manifold;
the second actuator is connected with the first and second offset control ports of the manifold;
flow communication is established between the fluid source and the first actuator when the first and second solenoid valves are each in the first valve positions; and
flow communication is established between the fluid source and the second actuator when the first and second solenoid valves are each in the second valve positions.

9. A compacting vehicle comprising:
an articulated frame having left and right lateral sides and including a front frame half and a rear half movably connected with the front frame half;
a least one drum member rotatably connected with one of the frame halves; and
a control system mounted on the frame and including:
- a steering mechanism disposed between the front and rear frame halves and configured to pivot the rear frame half with respect to the front frame half;
- a first hydraulic actuator operably connected with the steering mechanism;
- an offset mechanism disposed between the front and rear frame halves and configured to displace the rear frame half with respect to the front frame half in a direction generally toward one of the lateral sides of the vehicle;
- a second hydraulic actuator operably connected with the offset mechanism;
- a hydraulic circuit including a hydraulic fluid source and a selector valve device connected with the fluid source and with each of the first and second actuators, the selector valve device being configured to selectively direct hydraulic fluid to the first actuator to operate the steering mechanism and alternatively to the second actuator to operate the offset mechanism; and
- an operator controller device connected with the hydraulic circuit and configured to adjust hydraulic flow between the fluid source and the selector valve device so as to control extent and direction of movement of the rear frame half with respect to the front half by a selectively operated one of the steering mechanism and the offset mechanism.

10. The compacting vehicle as recited in claim 9 wherein the selector valve device has first and second primary ports and the operator controller device includes:
- a rotatable steering wheel disposed on one of the frame halves; and
- a rotational metering valve connected with the steering wheel, with the fluid source and with the selector valve device and configured such that rotation of the steering wheel in a first direction causes the metering valve to direct an amount of fluid to the first primary port and rotation of the steering wheel in a second direction causes the metering valve to direct an amount of fluid to the second primary port, the amounts of fluid directed to the primary ports by the metering valve being proportional to the extent of rotation of the wheel.

11. The compacting machine as recited in claim 10 wherein:
the first and second actuators are each movable in two opposing directions:
the selector valve device is configured to direct fluid flowing into the first primary port to a selected one of the two actuators so as to move the selected actuator in a first direction and to direct fluid flowing into the second primary port to the selected actuator so as to move a selected one of the two actuators in a second direction, the amount of movement of the selected actuator in one of the first and second directions being proportional to the extent of rotation of the wheel.

12. A compacting vehicle comprising:
an articulated frame having left and right lateral sides and including a front frame half and a rear half movably connected with the front frame half;
a least one drum member rotatably connected with one of the frame halves; and
a control system mounted on the frame and including:
- a steering mechanism disposed between the front and rear frame halves and configured to pivot the rear frame half with respect to the front frame half;
- a first hydraulic actuator operably connected with the steering mechanism;
- an offset mechanism disposed between the front and rear frame halves and configured to displace the rear frame half with respect to the front frame half in a direction generally toward one of the lateral sides of the vehicle;
- a second hydraulic actuator operably connected with the offset mechanism;
- a hydraulic circuit including a hydraulic fluid source and a selector valve device connected with the fluid source and with each of the first and second actuators, the selector valve device being configured to selectively direct hydraulic fluid to the first actuator to operate the steering mechanism and alternatively to the second actuator to operate the offset mechanism; and
- an operator input device connected with the selector valve device and configured to operate the selector valve to selectively direct fluid to one of the first and second actuators wherein:

the selector valve includes a solenoid valve; and the operator input device includes an electrical circuit connected with the solenoid valve and having an operator-activatable switch configured to operate the solenoid valve such that the solenoid valve directs fluid to one of the two actuators when the switch is activated and directs fluid to the other one of the two actuators when the switch is non-activated.

13. A compacting vehicle comprising:

an articulated frame having left and right lateral sides and including a front frame half and a rear half movably connected with the front frame half;

a least one drum member rotatably connected with one of the frame halves; and a control system mounted on the frame and including:

a steering mechanism disposed between the front and rear frame halves and configured to pivot the rear frame half with respect to the front frame half;

a first hydraulic actuator operably connected with the steering mechanism;

an offset mechanism disposed between the front and rear frame halves and configured to displace the rear frame half with respect to the front frame half in a direction generally toward one of the lateral sides of the vehicle;

a second hydraulic actuator operably connected with the offset mechanism; and a hydraulic circuit including a hydraulic fluid source and a selector valve device connected with the fluid source and with each of the first and second actuators, the selector valve device being configured to selectively direct hydraulic fluid to the first actuator to operate the steering mechanism and alternatively to the second actuator to operate the offset mechanism; wherein the selector valve device includes:

a manifold having first and second primary ports, first and second steering control ports and first and second offset ports;

a solenoid valve at least partially disposed within the manifold and movable between a first position where flow communication is established between the first primary port and the first steering port and between the second primary port and the second steering port and a second position where flow communication is established between the first primary port and the first offset port and between the second primary port and the second offset port.

* * * * *